(12) United States Patent
Engler et al.

(10) Patent No.: US 9,624,134 B2
(45) Date of Patent: Apr. 18, 2017

(54) TITANIUM DIBORIDE GRANULES AS EROSION PROTECTION FOR CATHODES

(75) Inventors: Martin Engler, Kempten (DE); Georg Victor, Kempten (DE)

(73) Assignee: 3M INNOVATIVE PROPERTIES COMPANY, Saint Paul, MN (US)

( * ) Notice: Subject to any disclaimer, the term of this patent is extended or adjusted under 35 U.S.C. 154(b) by 39 days.

(21) Appl. No.: 14/240,181

(22) PCT Filed: Aug. 2, 2012

(86) PCT No.: PCT/EP2012/065189
§ 371 (c)(1),
(2), (4) Date: May 1, 2014

(87) PCT Pub. No.: WO2013/026674
PCT Pub. Date: Feb. 28, 2013

(65) Prior Publication Data
US 2014/0272116 A1    Sep. 18, 2014

(30) Foreign Application Priority Data

Aug. 23, 2011   (DE) .................. 10 2011 111 331

(51) Int. Cl.
| | |
|---|---|
| *C04B 35/00* | (2006.01) |
| *C04B 35/58* | (2006.01) |
| *C04B 35/63* | (2006.01) |
| *C25C 3/08* | (2006.01) |
| *C01B 35/04* | (2006.01) |
| *C04B 35/626* | (2006.01) |
| *C04B 35/632* | (2006.01) |
| *C04B 35/634* | (2006.01) |
| *C04B 35/636* | (2006.01) |
| *B82Y 30/00* | (2011.01) |

(52) U.S. Cl.
CPC ........ *C04B 35/58071* (2013.01); *B82Y 30/00* (2013.01); *C01B 35/04* (2013.01); *C04B 35/6263* (2013.01); *C04B 35/62655* (2013.01); *C04B 35/632* (2013.01); *C04B 35/6303* (2013.01); *C04B 35/636* (2013.01); *C04B 35/6316* (2013.01); *C04B 35/6365* (2013.01); *C04B 35/63424* (2013.01); *C25C 3/08* (2013.01); *C04B 2235/3217* (2013.01); *C04B 2235/3218* (2013.01); *C04B 2235/3418* (2013.01); *C04B 2235/483* (2013.01); *C04B 2235/5427* (2013.01); *C04B 2235/5436* (2013.01); *C04B 2235/5445* (2013.01); *C04B 2235/5454* (2013.01); *C04B 2235/5463* (2013.01); *C04B 2235/5481* (2013.01); *C04B 2235/96* (2013.01); *Y10T 428/2982* (2015.01)

(58) Field of Classification Search
CPC .......... C04B 35/58071; C04B 35/6303; C04B 35/6316; C01B 35/04; C25C 3/08
USPC ................................. 501/96.3; 423/274, 297
See application file for complete search history.

(56) References Cited

U.S. PATENT DOCUMENTS

| | | | |
|---|---|---|---|
| 3,766,025 A | 10/1973 | Effird | |
| 4,544,524 A | 10/1985 | Mizrah et al. | |
| 4,612,103 A * | 9/1986 | Dewing et al. | ............. 204/247.3 |
| 4,647,405 A * | 3/1987 | Debely | .................... 252/520.22 |
| 2011/0104033 A1* | 5/2011 | McMillen | ..................... 423/297 |

FOREIGN PATENT DOCUMENTS

| | | | |
|---|---|---|---|
| CN | 100366578 | * | 2/2008 |
| CN | 101844926 A | | 9/2010 |
| DE | 10 2006 013 746 A1 | | 9/2007 |
| EP | 116809 | * | 8/1984 |
| WO | 00/29644 A1 | | 5/2000 |
| WO | 00/36187 A1 | | 6/2000 |

OTHER PUBLICATIONS

Translatioin of CN 100366578, Feb. 2008.*
Maryam Mohammed Al Jalfaf, et al. "Simplifying Protection System to Prolong Cell Life", Light Metals 2011, pp. 1079-1084, Feb. 28, 2011, XP-002685865.

* cited by examiner

*Primary Examiner* — Steven Bos
(74) *Attorney, Agent, or Firm* — C. Michael Geise

(57) ABSTRACT

The invention relates to titanium diboride granules comprising aggregates of titanium diboride primary particles, wherein the titanium diboride granules have a rounded shape and are fracture-resistant.
The invention further relates to a method for producing these titanium diboride granules, the use thereof for covering graphite cathodes in electrolytic cells in Al fused-salt electrolysis or for repairing holes in cathode bases of electrolytic cells and also a method for repairing holes in cathode bases of electrolytic cells.

19 Claims, No Drawings

TITANIUM DIBORIDE GRANULES AS EROSION PROTECTION FOR CATHODES

This is a National Phase Application filed under 35 U.S.C. 371 as a national stage of PCT/EP2012/065189, filed Aug. 2, 2012, an application claiming the benefit from German Application No. 10 2011 111 331.6, filed Aug. 23, 2011, the entire content of each of which is hereby incorporated by reference in its entirety.

TECHNICAL FIELD

The present invention relates to titanium diboride granules for use for the erosion protection of carbon or graphite cathodes in fused salt electrolysis of aluminium and for the repair of holes in cathodes of electrolytic cells.

BACKGROUND OF THE INVENTION

In fused salt electrolysis of aluminium, an electrolytic cell comprises a bath made of iron sheet or steel, whose base is lined with a thermal insulation. Located in this bath are a plurality of adjacently disposed cathode blocks which are sealed by refractory lining material and form the cell base. The conversion of the electrolytic bath to aluminium takes place in this melting bath under the action of the electric current. This reaction generally takes place at a temperature of above 950° C.

In order to meet the requirements for the thermal and chemical resistance and to ensure the required electrical conductivity, the cathode blocks are made of carbon-containing materials, which can be semi-graphitic to graphitic. These materials are formed by extrusion or vibration compaction after thorough mixing of the basic materials. In this case, a mixture of pitch, calcined anthracite and/or graphite can be used which is then baked at about 1200° C. The semi-graphitic cathode produced from these mixtures is generally designated as carbon cathode. A mixture of pitch and coke with or without added graphite can also be used. In this case the materials are baked at about 800° C. and then graphite-annealed at above 2400° C.

This graphitic cathode thus produced is called graphite cathode.

The carbon cathodes conventionally used have only moderate electrical and thermal properties, which no longer satisfy the operating conditions of modern cells, in particular those having a high current intensity. The need to reduce the energy consumption, in particular in existing installations, has promoted the use of graphite cathodes.

The graphite annealing treatment of the graphite cathode at above 2400° C. makes it possible to increase the electrical and thermal conductivity with the result that conditions are created which contribute to an optimised operation of an electrolytic cell. As a result of the reduction in the electrical resistance of the cathode, the energy consumption decreases. In addition, the intensity of the current introduced into the cell can be increased, with the result that an increase in aluminium production is possible. The high thermal conductivity of the cathode then allows the excess heat generated as a result of the increase in the current intensity to be led off. In addition, the graphite cathode cells are electrically less unstable than the carbon cathode cells, i.e. they exhibit a smaller fluctuation of the electrical potentials.

However, it has been found that cells equipped with graphite cathodes have a shorter lifetime than cells equipped with carbon cathodes. This is because the erosion rate of a graphite cathode block is significantly higher than that of a carbon cathode block.

The low erosion resistance of a graphite cathode block is therefore its weak point and the problem arises of increasing the erosion resistance and therefore the lifetime of the graphite cathode blocks.

In addition to the extensive wear of the cathode block, the formation of local conically shaped holes in the cathode base is a serious problem. These holes grow from the surface of the cathode in the direction of the busbar. If the busbar is reached, this results in a substantial increase in the iron content of the aluminium and ultimately in destruction of the cell.

PRIOR ART

In order to reduce the wear of the cathode block, there are various possibilities.

WO 00/29644 describes a method for in-situ formation of titanium diboride at the cathode surface whereby the erosion and oxidation resistance of the cathode is to be increased.

WO 00/36187 describes a method for producing multi-layer cathodes in which at least one metal-boride containing layer lies above the graphite cathode. In addition to metal boride, the layers also contain carbon. As a result, the erosion and oxidation resistance of the cathode should also be increased.

The use of titanium diboride graphite mixtures as protective layers on cathodes to increase their erosion resistance is well-known in the industry although still rarely used. An advantage of these layers is the significantly increased wettability by aluminium compared to pure graphite cathodes and the associated possibility of reducing the anode-cathode gap and therefore of significantly reducing the energy consumption of the cell or increasing its productivity. A serious disadvantage of the previously described titanium boride-graphite mixtures are the required large quantities of expensive $TiB_2$ (25-50% of a layer up to 100 mm thick) and the expensive production process for multi-layer cathodes such as, for example, co-extrusion or an additional vibration compaction process. In addition, the complementary part of the layer still consists of graphite or carbon-based binders which are attacked by erosion. If they are dissolved out from the layer, the $TiB_2$ is also dissolved out from the composite.

The publication "Simplifying Protection System to Prolong Cell Life", Maryam Mohamed Al Jallaf, Margaret Hyland, Barry Welch, Ali Al Zarouni, Light Metals 2011, 1079-1084, describes another method for protection of the cathode by using titanium diboride. In this case, $TiB_2$ is introduced into the cell in the form of splintered or angular, non-rounded granules which are distributed on the cathode surface due to the flow in the cell. Preferably the $TiB_2$ accumulates in already-existing recesses formed by erosion. By using granules, a cathode surface is obtained which is protected from erosion by the bulk material of titanium diboride granules. The layer density of a granular bulk material can be reduced significantly compared with $TiB_2$-graphite mixtures and no special method of manufacture is required for the cathode as described previously. The disadvantage of this method is the soft granules. These have only a low compressive strength and are easily broken up and pulverised by mechanical loading such as pressure and friction. Small $TiB_2$ particles thereby produced are entrained during regular extraction of the molten liquid aluminium from the cell and result in particulate impurities in the aluminium. These are strength-reducing and lead in particular to defects in rolling processes. Another disadvantage as a result of the destruction of the granules is the attainable packing density. Whereas a high packing density with few free spaces between the individual granules is possible with optimised granular size distributions, destroyed granules cause deterioration in the ratio of $TiB_2$ to free intermediate space.

U.S. Pat. No. 3,766,025 describes a method for repairing holes in the cathode in which the holes are filled with granule-like material. This material can comprise aluminium oxide, silicon carbide or boron nitride, preferably alpha aluminium oxide. The production of the granules is not described. A disadvantage of this method is the lack of electrical conductivity of the filling materials. A filling of cathode holes with non-electrically conductive materials leads to a reduced productivity of the cell and therefore to higher production costs of the aluminium. The aluminium oxide conventionally used to repair the cathode holes additionally has the disadvantage that the corrosion resistance to molten cryolite is not satisfactory.

Usually the filling materials used to repair holes in the cathode are inserted loosely or with a transport packaging as paper container. A disadvantage of this method is that the filling materials used for the repair cannot be efficiently positioned and during sinking onto the cell base are distributed not only in the holes but also on the undamaged cell base.

OBJECT OF THE INVENTION

It is therefore the object of the invention to provide a material which, whilst overcoming the disadvantages of the prior art, can improve the erosion and oxidation resistance of carbon or graphite cathodes in electrolytic cells used in fused salt electrolysis to produce aluminium.

It is further the object of the invention to provide bulk bodies for the repair of cathode holes in electrolytic cells which make it possible to achieve an improved productivity of the cell compared with the bulk bodies used in the prior art and which have an improved corrosion resistance with respect to molten cryolite.

It is furthermore the object of the invention to provide an improved method for repairing holes in the cathode base of electrolytic cells by which means the repair material can be introduced more specifically into the repair locations.

SUMMARY OF THE INVENTION

The preceding object is solved according to the invention by titanium diboride granules according to claim 1, a method for producing these titanium diboride granules according to claim 8, the use of these titanium diboride granules according to claims 17 and 18 as well as a method using these titanium diboride granules according to claim 19.

The subject matter of the invention is therefore titanium diboride granules comprising aggregates of titanium diboride primary particles, wherein the titanium diboride granules have a rounded shape and are fracture-resistant.

The subject matter of the invention is furthermore a method for producing these titanium diboride granules, comprising the steps:
a) mixing $TiB_2$ powder with binder raw materials and/or adjuvants and/or solvents,
b) producing $TiB_2$ granule raw bodies in the desired size,
c) optionally drying and/or debindering to remove solvents and/or adjuvants and d) thermal treatment of the $TiB_2$ granule raw bodies to produce $TiB_2$ granules.

The subject matter of the invention is furthermore the use of titanium diboride granules according to the invention for covering carbon or graphite cathodes in electrolytic cells, which are used to produce aluminium in fused salt electrolysis.

The subject matter of the invention is furthermore the use of titanium diboride granules according to the invention for repairing holes in cathode bases of electrolytic cells which are used to produce aluminium in fused salt electrolysis.

The subject matter of the invention is furthermore a method for repairing holes in cathode bases of electrolytic cells which are used to produce aluminium in fused salt electrolysis comprising the following steps:
a) producing titanium diboride Al composite shaped bodies from $TiB_2$ granules according to the invention and aluminium
b) introducing the shaped bodies into the holes of the cathode to be repaired during operation of the cell.

The titanium diboride granules according to the invention have the advantage compared with conventional titanium diboride granules that the complete absence of graphite from the functional surface of the cathode leads to a severe reduction in the wear caused by erosion and therefore leads to an increase in the lifetime of the cathode. As a result of the cathode cover layer consisting only of titanium diboride, smaller layer thicknesses can be achieved than with titanium diboride-graphite mixtures. By introducing the titanium diboride granules onto the cathode after installing the cathode into the electrolytic cell, expensive co-extrusion or additional vibro-compaction processes which are required with the conventional titanium diboride graphite-mixtures can be dispensed with so that overall the manufacturing costs of the cathode can be reduced significantly.

Compared with the known soft $TiB_2$ granules, the titanium diboride granules according to the invention have the advantage that they are mechanically more stable, i.e. abrasion-proof and break-resistant and therefore are stable during transport and not comminuted by pressure or friction.

The formation of fine particles which are entrained during the regular extraction of the aluminium from the cell is therefore largely avoided so that the properties of the aluminium are not negatively influenced and rolling defects as well as losses of strength are reduced.

The hard or pressure-resistant granules are furthermore advantageous in that due to specific mixing of various granule or grain fractions, set high packing densities are maintained over the lifetime of the cell and form a compact layer so that the cathode is better protected from wear due to erosion.

The granules according to the invention are furthermore advantageous in that they have a rounded shape and can thus be better distributed on the cathode surface.

Compared to conventional granules used to repair cathodes worn in places, the titanium diboride granules according to the invention have the advantage that they are electrically conductive and do not negatively influence the productivity of the cell and therefore the manufacturing costs of the aluminium. In addition, compared with the $Al_2O_3$ conventionally used, they have the advantage that the $TiB_2$ is more corrosion-resistant to molten cryolite.

With the method according to the invention for repairing cathodes worn in places, i.e. holes in the cathode in which the titanium diboride granules are inserted in the form of $TiB_2$—Al ingots, it is possible to position the titanium diboride granules specifically at the repair location without them being distributed over a larger area. The compact $TiB_2$—Al ingots sink into the hole in the cathode and dissolve there, i.e. the aluminium melts and the $TiB_2$ granules remain at the damage location which can thus be better filled than by the conventional method.

DETAILED DESCRIPTION OF THE INVENTION

The $TiB_2$ granules according to the invention are mechanically stable and have a higher compressive strength and hardness compared with the known soft granules. As a result they are abrasion-proof and fracture-resistant as well as stable during transport and dimensionally stable during filling and during introduction of the granules into the melting bath of the Al electrolytic cell for covering the cathode, i.e. the shape and structure of the granules is maintained in these steps.

The compressive strength of the $TiB_2$ granules according to the invention measured as maximum force before rupture of the granules in the pressure test is preferably at least 5 N, further preferably at least 7 N, further preferably at least 9 N and particularly preferably at least 12 N. The compressive strength is measured on the basis of DIN 51104. Unlike DIN 51104, the use of intermediate plates (see 3 in FIG. 2 and Section 5.2 of DIN) is not necessary since the strength of the granules compared to sintered ceramics is lower. Unlike DIN 51104, the calculation of a rupture stress relative to an area is furthermore dispensed with and the compressive strength is specified as the maximum load before rupture of the granules (breaking force).

The $TiB_2$ granules according to the invention preferably comprise an inorganic binder which can more suitably be contained in a quantity of up to 10 wt. %, particularly preferably at most 1 wt. % relative to the total weight of the $TiB_2$ granules.

The inorganic binder preferably comprises an oxidic binder. Preferably the oxidic binder comprises an Al compound selected from the group consisting of aluminium oxide ($Al_2O_3$), aluminium hydroxide ($Al(OH)_3$) and boehmite ($AlO(OH)$), $SiO_2$ or combinations thereof. The inorganic binder is particularly preferably an Al compound, preferably $Al_2O_3$.

The granule size of the $TiB_2$ granules according to the invention can be 1 mm to 10 mm. Preferably the granule size is between 2 and 7 mm. It is further preferred that at least 80 wt. % of the titanium diboride granules have a granule size of at least 2 mm. The granule size in this case is determined by a usual sieve analysis so that the aforesaid granule size comprises the "sieve size". A sieve size therefore means that the granules pass through a sieve having a mesh width of 10 mm but no longer pass through a sieve having a mesh width of 1 mm.

The shape of the granules according to the invention is not angular, blocky or splintered but rounded, they can be "potato-shaped" or pebble-shaped to rounded or spherical.

The granules according to the invention are thermally stable under the conditions of usage in Al electrolysis.

The $TiB_2$ granules according to the invention can be produced by means of a method which comprises the following steps:
a) mixing $TiB_2$ powder with binder raw materials and/or adjuvants and/or solvents,
b) producing $TiB_2$ granule raw bodies in the desired size,
c) optionally drying and/or debindering to remove solvents and/or adjuvants and
d) thermal treatment (sintering) of the $TiB_2$ granule raw bodies to produce $TiB_2$ granules.

It is possible to combine steps a) and b) and carry them out in one working step. Likewise, steps c) and d) can be executed in one working step.

Starting material for the $TiB_2$ granules according to the invention in step a) are $TiB_2$ powder (head of primary particles) in a fineness and purity of typical commercially available qualities such as are used to produce sintered components. The mean particle size ($d_{50}$) of this type of $TiB_2$ powder used is preferably about 2-20 μm.

The fineness of the $TiB_2$ powder (primary particle size distribution, BET) has an influence on the processing behaviour in the respective process step (mixing, granulating, compacting, extruding) or determines different processing parameters in different processing techniques to achieve a defined end product size. A finer starting powder requires more liquid and longer process times in order to achieve a certain granule size. This also applies to the production of extrusion compounds or pressing compounds.

If binder raw materials which form thermally stable binders are added to produce the $TiB_2$ granules according to the invention, inorganic binder raw materials or precursors of such materials are used as binder raw materials in step a), that is materials which during hardening of the $TiB_2$ granules in step d) form inorganic binders (so-called precursor binder systems). Oxide ceramic binder raw materials or materials which form an oxide ceramic during hardening of the $TiB_2$ granules can be used. $SiO_2$-based or $SiO_2$-forming binder raw materials can be used as well as $Al_2O_3$-based or $Al_2O_3$-forming binder raw materials. Preferred are $Al_2O_3$-based or $Al_2O_3$-forming binder raw materials, particularly preferred are $Al_2O_3$-forming binder raw materials.

In order to achieve a good binding effect, preferably nanoscale binder raw materials are used or those which form nanoscale binder particles under the manufacturing conditions of step b) to d) (precursor binder systems) since these exhibit the desired properties in very low concentrations and at correspondingly lower temperatures. Nanoscale binders are understood as binders having a mean particle size of <100 nm. Examples for $SiO_2$-based binder raw materials are fumed silica, fused silica, precipitated silicic acid and quartz flour.

For example, silanes and siloxanes can be used as $SiO_2$-forming precursor binder systems as precursors for $SiO_2$ binding phases and for example, $Al(OH)_3$ or $AlO(OH)$ as precursors for $Al_2O_3$ binding phases.

Commercially available $SiO_2$ sols (both aqueous and ethanolic) can be used as $SiO_2$-based binder raw materials which, depending on the initial concentration, optionally suitably diluted, can be used directly as binder solution for granulation. Examples for suitable commercially available water-based products are $SiO_2$ sols from NALCO and Köstrosol (Chemiewerk Bad Kostritz).

If the selected binder raw materials are not already present in liquid form, they are preferably converted into soluble form where both organic solvents and also water or mixtures of organic solvents and water can be used as solvent.

An example of an ethanol binder raw material is an ethanol suspension of nano-$SiO_2$ particles and silanes, available from EPG (product designation MKTS) or Inomat (product designation Inosil).

Examples for $Al_2O_2$-based binder raw materials are commercially available $Al_2O_2$ sols or sol gels such as for example $Al_2O_2$ nanoparticle dispersions having particle sizes of <100 nm. Furthermore, very fine corundum particles having a mean particle size ($d_{50}$) of <1 μm can be used.

Preferably AlO(OH) sol gels (boehmite sol gels) are used as $Al_2O_3$-forming precursor binder systems which, by varying the concentration, enable the desired $Al_2O_3$ binder content in the end product to be adjusted over a wide range and which furthermore also have good processing properties during granulation.

The quantity of binder raw materials is advantageously to be selected so that the electrical conductivity of the titanium diboride granules is not negatively influenced.

The adjuvants in step a) can optionally be added organic binders such as, for example, acrylates (e.g. Duramax), celluloses (e.g. Degalan), polysaccharides and wax (stearin) as well as pressing adjuvants and plasticizers which are decomposed in the thermal treatment in step d).

Preferably a solvent is used for granulation if no dry compaction is carried out. Usually water is preferred for granulation. Other liquids can also be used.

Various methods which lead to a rounded shape of the finished granules can be used to produce the $TiB_2$ granules according to the invention in step b).

One possible method is pelleting. In this case, a plastic, ceramic mass of $TiB_2$ powder and optionally a solution, a sol or a gel of binder raw materials is processed, for example, by means of a beam press and appropriate sieve inserts to form strands or broken strand granules. The pelleting can be carried out by means of a kneader and a connected extruder and corresponding form inserts whereby strands or broken strand granules can be produced. The strands having a diameter of, for example 5 mm, are cut to the desired length of, for example, 5 mm or are obtained through the moisture of the mass as broken strands.

Depending on the concentration and quantity of the required binder solution and of the primary particle size distribution of the $TiB_2$ powder used, optionally additional processing adjuvants such as plasticizers or pressing adjuvants can be used. For example, acrylates (e.g. Duramax), celluloses (e.g. Degalan), polysaccharide and wax (stearin) can be used as process adjuvants. The raw material used for the broken strand granulation more suitably contains about 30 wt. % of solvent, preferably water.

Another possible granulating method is the tableting of a mixture of $TiB_2$ powder and solvent as well as optionally binder raw materials which are compacted after mixing/homogenizing by means of presses and mould inserts to form pellets, tablets, lenses or scales. Optionally additional process adjuvants and pressing aids can be used here. The pressing mixture used for tableting more suitably contains about 5 wt. % of solvent, preferably water as well as about 10 wt. % of dry pressing adjuvant. For example, acrylates, celluloses, polysaccharides and wax such as stearin can be used as pressing adjuvant.

One possible method for producing the $TiB_2$ granules according to the invention in step b) is dry compacting. To this end, in step a) $TiB_2$ powder is mixed with pressing adjuvants, for example, with waxes and optionally dry binder raw materials and compacted. The pressing adjuvants are either removed again in step d) or already previously in step c) in a separately executed debindering step.

A preferred method for producing $TiB_2$ granules according to the invention is build-up granulation of $TiB_2$ powders to form granules of, for example, 5 mm mean diameter. Build-up granulation usually results in rounded to round-spherical granules. In this case, steps a) and b) can be executed jointly, i.e. mixing and granulating takes place in one step.

By this means binder-free $TiB_2$ granules or $TiB_2$ granules having a low binder fraction can be produced. Organic solvents or water, preferably water, can be used as solvent.

Taking into account charge size or available granulating volume, different granule sizes can be produced by build-up granulation in the same granulating time by varying the quantity of binder solution or the binder concentration, or different granule diameters are built up in a defined binder solvent range by varying the granulation time.

For build-up granulation it is particularly preferable to use boehmite sol gel as binder as a result of the rheological properties which stabilises the formed build-up granules as far as drying more efficiently than sols and dispersions. Another advantage of this binder is its water base.

The binder raw materials are advantageously used in dissolved form for better homogenisability, in this case the granules are preferably dried in step c).

The drying step c) is used to remove the solvent of the binder raw materials used or the water or solvent used for granulation. If a drying step is carried out as a separate process step, the solvent need not be taken into account in the following processing step d) (calcining, hardening/sintering). The green granules obtained in shaping step b) should not be moved or touched very much in order to minimise or avoid rupture and abrasion. The drying step can, for example, be carried out in a drying cabinet or circulating air drying cabinet but also in a rotary kiln or in a fluidized bed process. Other drying units are also possible.

Due to the thermal treatment of the granules in step d), their hardness and mechanical stability are increased.

In the case of $SiO_2$-based binders, the thermal treatment or the hardening preferably takes place at temperatures of at least 1400° C. in an inert atmosphere.

In the case of $Al_2O_3$-based binders, the thermal treatment or the hardening preferably takes place at temperatures of at least 1600° C. in an inert atmosphere.

In the case of $SiO_2$-forming binder raw materials (precursor binder systems), the thermal treatment or the hardening preferably takes place at temperatures of at least 900° C. in an inert atmosphere.

In the case of the particularly preferred $Al_2O_3$-forming binder raw materials (precursor binder systems), the thermal treatment or the hardening preferably takes place at temperatures of at least 800° C., particularly preferably of at least 1100° C., in an inert atmosphere.

In the case of the particularly preferably used binder raw material boehmite, a dewatering of the $TiB_2$ granules accompanied by conversion of the boehmite to $Al_2O_3$ is required at temperatures of at least 800° C. At 800° C. the conversion of AlO(OH) to $Al_2O_3$ commences, which is completed at 1100° C. As a result of the thermal treatment at 1100° C., the hardness and stability are additionally noticeably increased. The thermal treatment at 800° C. should preferably be carried out in an inert atmosphere for at least 30 minutes. The inert atmosphere prevents the oxidation of $TiB_2$ to $TiO_2$ which is not very resistant in cryolite/Al and is electrically non-conducting. Particularly preferably the thermal treatment is carried out at 1100° C. for at least 60 minutes in an inert atmosphere. On the one hand, all $H_2O$ produced is removed as a result, on the other hand the nanoscale $Al_2O_3$ begins to sinter and thus hardens the granules.

The calcining at 800° C. and the sintering at 1100° C. can be carried in two stages or also in one stage.

For binder-free $TiB_2$ granules the thermal treatment preferably takes place at temperatures of at least 1100° C., particularly preferably at temperatures between 1800 and 2100° C., particularly preferably at about 2000° C. in an inert atmosphere.

The $TiB_2$ granules according to the invention which were produced without using binder raw materials comprise sintered $TiB_2$ granules. The $TiB_2$ granules according to the invention which were produced using binder raw materials comprise, after the thermal treatment in step d), apart from the $TiB_2$ primary particles also an inorganic binder which in the case of $SiO_2$-based or $SiO_2$-forming binder raw materials is $SiO_2$, in the case of $Al_2O_3$-based or $Al_2O_3$-forming binder raw materials, the inorganic binder is $Al_2O_3$.

For the use of the $TiB_2$ granules according to the invention as erosion protection of carbon or graphite electrodes in aluminium electrolytic cells, the $TiB_2$ granules are applied to the cathode base before or after the filling commissioning of the electrolytic cell. The application and uniform distribution of the granular bulk material is ensured by the mechanical stability of the $TiB_2$ granules and is easily possible due to the rounded shape of the granules with respect to pellets and tablets.

The $TiB_2$ granules can be used as a repair compound for holes forming in the cathode during operation of the electrolytic cell. To this end, $TiB_2$ granules according to the invention are applied to the Al bath above the holes during operation of the electrolytic cell. The granules sink onto the cell base and fill, at least partially, the hole to be repaired.

In order to be able to insert the $TiB_2$ granules for the repair of holes better in the cathode, titanium boride-Al composite shaped bodies are produced from $TiB_2$ and aluminium ($TiB_2$—Al ingots). To this end, the $TiB_2$ granules are poured or stirred into liquid Al melts. Alternatively the $TiB_2$ granules are recast with aluminium. To this end the granules are poured into corresponding moulds or crucibles and recast with Al melt (low-pressure casting, gravity casting, permanent mould casting).

The resulting shaped bodies consist of a dense granular, tablet or pellet packing whose intermediate spaces are filled by the Al melt or penetrated by the solidified metal and thereby held together.

If the $TiB_2$ granules according to the invention are used with inorganic binders, the binder or the binder coating of the $TiB_2$ granules promotes wetting with melt.

The aluminium shaped bodies (blocks, cylinders or the like) thus obtained, which are filled with the $TiB_2$ granules, suitably weigh about 5-20 kg.

The $TiB_2$-filled aluminium shaped body is added to the melt tub above the hole in the cathode to be repaired and sinks. During sinking or after dipping into the hole to be repaired, the aluminium fuses and releases the $TiB_2$ granules.

EXAMPLES AND REFERENCE EXAMPLES

Example 1

Binder-Free Build-Up Granules 4.5 kg of $TiB_2$ powder ($d_{50}$ 11 μm) is placed in an Eirich intensive mixer. 500 ml of water is added whilst agitating and granulated for a total of 10 min. The resulting moist build-up granules are dried for 12 hours in a circulating air drying cabinet at >80° C.

The dried granules are then annealed at 1100° C. for 1 hour in argon (flowing).

The yield of granules having a size distribution of 0.2 mm to 5 mm determined by sieve analysis is 75%. The yield of granules having a size distribution of 2 mm to 5 mm is 60%.

The resulting granules have a rounded shape, are abrasion-proof and fracture-resistant and are not abradable or squashable between the fingers.

Example 2

Build-Up Granules with Boehmite Binder

In order to produce boehmite sol gel (binder raw material), Dispersal from Sasol is dispersed in water. The dispersion is heated to >95° C. and peptised by adding conc. $HNO_3$. After cooling the gel is present (6 wt. % $Al_2O_3$).

4.5 kg of $TiB_2$ powder (mean particle size $d_{50}$ 11 μm) is placed in an Eirich intensive mixer (type R02). 500 ml of the boehmite sol gel (6 wt. % $Al_2O_3$) is added whilst agitating and granulated for a total of 10 min. The resulting moist build-up granules are dried for 12 hours in a circulating air drying cabinet at >80° C.

The dried granules are then annealed at 1100° C. for 1 hour in argon (flowing).

The yield of granules having a size distribution of 0.5 mm to 8 mm determined by sieve analysis is 90%. The yield of granules having a size distribution of 2 mm to 8 mm is 70%.

The resulting granules have a rounded shape, are abrasion-proof and fracture-resistant and are not abradable or squashable between the fingers.

Example 3

Build-Up Granules with Boehmite Binder

Example 2 is repeated but the dried granules are not annealed at 1100° C. but at 800° C. for 1 hour in argon (flowing).

The resulting granules have a rounded shape, are abrasion-proof and fracture-resistant and are not abradable or squashable between the fingers.

Example 4

Binder-Free Build-Up Granules

Example 1 is repeated but the dried granules are not annealed at 1100° C. but at 2000° C. for 1 hour in argon (flowing).

The resulting granules have a rounded shape, are abrasion-proof and fracture-resistant and are not abradable or squashable between the fingers.

Example 5

Build-Up Granules with Boehmite Binder

Example 2 is repeated but the dried granules are not annealed at 1100° C. but at 2000° C. for 1 hour in argon (flowing).

The resulting granules have a rounded shape, are abrasion-proof and fracture-resistant and are not abradable or squashable between the fingers.

Example 6

Binder-Free Build-Up Granules 4.5 kg of $TiB_2$ powder (mean particle size $d_{50}$ 11 μm) is placed in an Eirich intensive mixer. 400 ml of boehmite sol gel from Example 2 (6 wt. % $Al_2O_3$) is added whilst agitating and granulated for a total of 10 min. The resulting moist granules are dried for 12 hours in a circulating air drying cabinet at >80° C.

The dried granules are then annealed at 1100° C. for 1 hour in argon (flowing).

The yield of granules having a size distribution of 0.2 mm to 5 mm determined by sieve analysis is 95%. The yield of granules having a size distribution of 2 mm to 5 mm is 80%.

The resulting granules have a rounded shape, are abrasion-proof and fracture-resistant and are not abradable or squashable between the fingers.

Reference Example 1

Binder-Free Filter Cake Granules 1.5 kg of $TiB_2$ powder ($d_{50}$ 11 μm) is dispersed by means of an agitator in 4 liter of water. The suspension is then filtered off. The resulting filter cake including filter paper is dried for 12 hours in a circulating air drying cabinet at >80° C.

The dried filter cake is then broken by a 5 mm sieve and the resulting broken material is again fractionated by means of a 1 mm sieve. The yield of granules having a size distribution of 1 mm to 5 mm is 5%.

The resulting granules have an angular or splintered shape, can easily be abraded or squashed between the fingers and therefore are not fracture-resistant.

Reference Example 2

Binder-Free Build-Up Granules

Example 1 is repeated but the dried granules are then not subjected to any thermal treatment.

The resulting granules have an angular or splintered shape, can easily be abraded or squashed between the fingers and therefore are not fracture-resistant.

Reference Example 3

Build-Up Granules with Boehmite Binder

Example 2 is repeated but the dried granules are then not subjected to any thermal treatment.

The resulting granules have an angular or splintered shape, can easily be abraded or squashed between the fingers and therefore are not fracture-resistant.

Reference Example 4

Binder-Free Filter Cake Granules

Example 1 is repeated but the filter cake granules are annealed at 1100° C. for 1 hour in argon (flowing).

The resulting granules have an angular or splintered shape, can easily be abraded or squashed between the fingers and therefore are not fracture-resistant.

Example 7

The granules produced from Examples 1 to 5 and from the reference examples 1 to 4 are then subjected to a compressive strength measurement.

The compressive strength of individual granular bodies was determined on the basis of DIN 51104 at a test rate of 2 mm/min (Zwick 1472 Universal testing machine with Software Softone TestXpert II for the machine control and measured data acquisition). The maximum load upon rupture/disintegration of a granule (test specimen) was measured as the compressive strength. Parallel pressure plates of hardened steel were used as the testing device. The measurement was made on a fraction of granules in the size range of 4 to 5 mm.

The results of the compressive strength testing shown as the maximum force before rupture of the granules are given in Table 1.

TABLE 1

| Example No. | Description | Maximum force [N] |
|---|---|---|
| Reference example 1 | Binder-free filter cake granules, dried | not measurable (<0.5) |
| Reference example 2 | Binder-free build-up granules, dried | 0.85 |
| Reference example 3 | Build-up granules with boehmite binder, dried | 2.08 |
| Reference example 4 | Binder-free filter cake granules, 1100° C. | 4.17 |
| Example 1 | Binder-free build-up granules, 1100° C. | 15.1 |
| Example 2 | Build-up granules with boehmite binder, 1100° C. | 20.5 |
| Example 3 | Build-up granules with boehmite binder, 800° C. | 15.2 |
| Example 4 | Binder-free build-up granules, 2000° C. | 100 |
| Example 5 | Build-up granules with boehmite binder, 2000° C. | 132 |

The invention claimed is:

1. Titanium diboride granules comprising aggregates of titanium diboride primary particles, wherein the titanium diboride granules have a rounded shape and are fracture-resistant, the titanium diboride granules further comprising an oxidic inorganic binder that comprises at least one aluminum compound selected from the group consisting of aluminum oxide, aluminum hydroxide, boehmite, and combinations thereof.

2. The titanium diboride granules according to claim 1, wherein the compressive strength of the titanium diboride granules measured as maximum force before rupture of the granules in the pressure test is at least 5 N.

3. The titanium diboride granules according to claim 1, wherein the at least one aluminum compound is aluminum oxide.

4. The titanium diboride granules according claim 1, wherein the titanium diboride granules have a mesh size between 1 and 10 mm.

5. The titanium diboride granules according to claim 1, wherein at least 80 wt. % of the titanium diboride granules have a granule size of at least 2 mm.

6. The titanium diboride granules according to claim 2, wherein the compressive strength of the titanium diboride granules measured as maximum force before rupture of the granules in the pressure test is at least 7 N.

7. The titanium diboride granules according to claim 6, wherein the compressive strength of the titanium diboride granules measured as maximum force before rupture of the granules in the pressure test is at least 9 N.

8. The titanium diboride granules according to claim 7, wherein the compressive strength of the titanium diboride granules measured as maximum force before rupture of the granules in the pressure test is at least 12 N.

9. The titanium diboride granules according to claim 1, wherein the inorganic binder further comprises $SiO_2$.

10. The titanium diboride granules according to claim 4, wherein the titanium diboride granules have a mesh size between 2 and 7 mm.

11. Method for producing titanium diboride granules according to claim 1, comprising the steps
    a) mixing titanium diboride powder with binder raw materials and adjuvants and solvents,
    b) producing titanium diborde granule raw bodies,
    c) optionally drying and/or debindering to remove solvents and/or adjuvants and
    d) thermal treatment of the titanium diboride granule raw bodies to produce titanium diboride granules.

12. Method for producing titanium diboride granules according to claim 11, wherein the mean particle size (d50) of the titanium diboride powder used is 2-20 μm.

13. Method for producing titanium diboride granules according to claim 11, wherein nanoscale binder raw materials or precursor binder systems which form nanoscale binder particles in step b) to d) are used as binder raw materials.

14. Method for producing titanium diboride granules according to claim 13, wherein $SiO_2$-forming binder raw materials are used.

15. Method for producing titanium diboride granules according to claim 13, wherein $Al_2O_3$-forming binder raw materials are used.

16. Method for producing titanium diboride granules according to claim 15, wherein AlO(OH) sol gel is used as binder raw material.

17. Method for producing titanium diboride granules according to claim 14, wherein the thermal treatment in step d) takes place at temperatures of at least 900° C. in an inert atmosphere.

18. Method for producing titanium diboride granules according to claim 15, wherein the thermal treatment in step d) takes place at temperatures of at least 800° C. in an inert atmosphere.

19. Method for repairing holes in cathode bases of electrolytic cells which are used to produce Al in fused salt electrolysis comprising the following steps:
    a) producing titanium diboride Al composite shaped bodies from titanium diboride granules according to claim 1 and aluminium
    b) introducing the shaped bodies into the holes of the cathode bases during operation of the cell.

* * * * *

UNITED STATES PATENT AND TRADEMARK OFFICE
CERTIFICATE OF CORRECTION

PATENT NO. : 9,624,134 B2  
APPLICATION NO. : 14/240181  
DATED : April 18, 2017  
INVENTOR(S) : Martin Engler Page 1 of 1

It is certified that error appears in the above-identified patent and that said Letters Patent is hereby corrected as shown below:

In the Claims

Column 12
Line 50, In Claim 4, after "according" insert -- to --.

Column 13
Line 9 (Approx.), In Claim 11, delete "diborde" and insert -- diboride --, therefor.
Line 15 (Approx.), In Claim 12, delete "(d50)" and insert -- ($d_{50}$) --, therefor.

Signed and Sealed this
Fourth Day of July, 2017

Joseph Matal
*Performing the Functions and Duties of the*
*Under Secretary of Commerce for Intellectual Property and*
*Director of the United States Patent and Trademark Office*